(12) United States Patent
Kira

(10) Patent No.: US 11,485,579 B2
(45) Date of Patent: Nov. 1, 2022

(54) FLANGE-NUT POSTURE CONTROL DEVICE

(71) Applicant: TOYOTA JIDOSHA KABUSHIKI KAISHA, Toyota (JP)

(72) Inventor: Kazuhiko Kira, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/404,509

(22) Filed: Aug. 17, 2021

(65) Prior Publication Data

US 2022/0063918 A1 Mar. 3, 2022

(30) Foreign Application Priority Data

Aug. 28, 2020 (JP) .............................. JP2020-144426

(51) Int. Cl.
*B65G 11/08* (2006.01)
*B65G 11/20* (2006.01)
*B65G 47/248* (2006.01)

(52) U.S. Cl.
CPC .......... *B65G 11/203* (2013.01); *B65G 47/248* (2013.01)

(58) Field of Classification Search
CPC .. B65G 47/248; B65G 11/081; B65G 11/086; B25B 23/04
USPC ......................................................... 193/46
See application file for complete search history.

(56) References Cited

U.S. PATENT DOCUMENTS

| | | | | |
|---|---|---|---|---|
| 4,100,882 A | * | 7/1978 | Duffy ..................... | B23G 11/00 118/313 |
| 4,700,471 A | * | 10/1987 | Shemeta ................. | B25B 23/04 221/173 |
| 6,006,891 A | * | 12/1999 | Iwano ................... | B65G 47/248 198/417 |
| 6,259,967 B1 | * | 7/2001 | Hartlepp ............ | B65G 47/1492 198/444 |
| 6,918,485 B2 | * | 7/2005 | Holston ................. | B65G 47/66 198/417 |
| 7,896,194 B2 | * | 3/2011 | Sakota ............... | B23K 11/0053 198/468.4 |
| 9,085,055 B2 | * | 7/2015 | Sugimoto ............. | B23P 19/007 |
| 9,376,266 B2 | * | 6/2016 | Kira ...................... | B23P 19/004 |
| 11,167,928 B2 | * | 11/2021 | Kira ..................... | B65G 11/086 |

(Continued)

FOREIGN PATENT DOCUMENTS

| | | |
|---|---|---|
| JP | 2013-023288 A | 2/2013 |
| JP | 2019-188515 A | 10/2019 |
| WO | 2013/008078 A1 | 1/2013 |

*Primary Examiner* — Joseph A Dillon, Jr.

(74) *Attorney, Agent, or Firm* — Sughrue Mion, PLLC

(57) ABSTRACT

In a flange-nut posture control device includes a first opening, a direction controlling portion is constituted by two vertical wall portions extending in a vertical direction such that the vertical wall portions are distanced from each other to face each other via a space with a distance smaller than the diameter of a flange portion of the flange nut. A lower guide portion is provided such that a V-shaped groove having a bottom portion between the vertical wall portions extends to be inclined from a horizontal plane. A second opening is surrounded by at least the vertical wall portions and the lower guide portion and formed such that the flange nut is passed through the second opening. An outlet groove portion is connected to the lower guide portion at an end surface of the second opening and extends with the same inclination as the lower guide portion.

10 Claims, 8 Drawing Sheets

(56) References Cited

U.S. PATENT DOCUMENTS

| | | | | |
|---|---|---|---|---|
| 11,299,349 B2* | 4/2022 | Kira | ........................ | B25B 23/04 |
| 2009/0260951 A1* | 10/2009 | Groenewald | .......... | B65G 27/04 |
| | | | | 198/411 |
| 2014/0140802 A1* | 5/2014 | Kira | ....................... | B65G 47/24 |
| | | | | 414/754 |
| 2018/0155138 A1* | 6/2018 | Kakuho | ................. | B65G 54/02 |
| 2021/0179304 A1* | 6/2021 | Lovedale | .............. | B65B 25/065 |

\* cited by examiner

FLANGE-NUT POSTURE CONTROL DEVICE

CROSS-REFERENCE TO RELATED APPLICATION

This application claims priority to Japanese Patent Application No. 2020-144426 filed on Aug. 28, 2020, incorporated herein by reference in its entirety.

BACKGROUND

1. Technical Field

The present disclosure relates to a flange-nut posture control device.

2. Description of Related Art

In a step of assembling a flange nut (a flanged nut), technologies to supply the flange nut by adjusting the posture of the flange nut have been proposed. For example, a flanged-nut temporarily-tightening jig including a nut supply portion configured to supply a flanged nut, and a nut tightening portion configured to attach and tighten a plurality of flanged nuts to a workpiece is disclosed (Japanese Unexamined Patent Application Publication No. 2019-188515 (JP 2019-188515 A)).

SUMMARY

In the abovementioned technology, flange nuts can be easily supplied without a large-scale device. However, the inventors of the technology have found the following problem. That is, when the above device is applied to lightweight or small flanged nuts, the flanged nuts may not be aligned in desired postures.

The present disclosure has been accomplished in order to solve the above problem, and an object of the present disclosure is to provide a flange-nut posture control device that can easily control the posture of a flange nut with a small scale.

A flange-nut posture control device according to the present disclosure is a flange-nut posture control device for discharging a flange nut by controlling a posture of the flange nut and includes a first opening, a direction controlling portion, a lower guide portion, a second opening, and an outlet groove portion. The first opening is configured to receive the flange nut. The direction controlling portion is provided below the first opening, and the direction controlling portion is constituted by vertical wall portions extending in a vertical direction such that the vertical wall portions are distanced from each other to face each other via a space with a distance larger than a thickness of the flange nut but smaller than a diameter of a flange portion of the flange nut. The lower guide portion is provided below the direction controlling portion such that a V-shaped groove having a bottom portion between the vertical wall portions extends along the vertical wall portions. The V-shaped groove is inclined from a horizontal plane such that a position of a second end side of the V-shaped groove is lower than a position of a first end side of the V-shaped groove. The second opening is surrounded by at least the vertical wall portions and the lower guide portion and formed such that the flange nut is passed through the second opening. The outlet groove portion is connected to the lower guide portion at an end surface of the second opening. The outlet groove portion has a V-shaped groove extending to be inclined such that the V-shaped groove is lowered toward a direction distanced from the end surface. The V-shaped groove has a depth dimension that becomes shallower as the V-shaped groove is distanced from the end surface.

Hereby, the flange nut thrown in the first opening is discharged from the end surface of the second opening in a posture in which a flange surface of the flange nut faces a lateral side. Subsequently, at the time of sequentially passing through the outlet groove portion and an outlet flat portion, the flange nut slides down on the outlet flat portion by deadweight by changing the posture such that the flange surface faces downward.

The flange-nut posture control device may further include an upper guide portion provided above the second end side of the lower guide portion and including a guide rib projecting downward with a top part being disposed between the vertical wall portions, the guide rib extending along the vertical wall portions and in parallel to the V-shaped groove of the lower guide portion. Hereby, the flange-nut posture control device can control the posture of the flange nut in a desired direction.

In the flange-nut posture control device, the upper guide portion may be set such that the top part of the guide rib is lower than an upper end of the flange portion of the flange nut passing through the upper guide portion. Hereby, the upper guide portion controls the posture of the flange nut in a direction where the flange nut falls down with the flange surface facing downward.

The flange-nut posture control device may further include a bouncing prevention guide provided adjacent to the first end side of the upper guide portion, the bouncing prevention guide being provided over the two vertical wall portions with an inclination larger than an inclination of the lower guide portion such that a dimension on the second end side between the bouncing prevention guide and the lower guide portion is smaller than a dimension on the first end side between the bouncing prevention guide and the lower guide portion. Hereby, the bouncing prevention guide can guide the flange nut to the upper guide portion by restraining an unstable behavior of the flange nut.

In the flange-nut posture control device, the outlet groove portion may be set such that, in a state where a flange surface of the flange nut makes contact with a first inclined surface of the V-shaped groove, and a corner of a diagonal-line part on a nut surface of the flange nut and a side part of the flange portion of the flange nut make contact with a second inclined surface of the V-shaped groove, a gravitational center of the flange nut comes closer to the first inclined surface making contact with the flange surface than to the second inclined surface with which the corner of the diagonal-line part makes contact. Hereby, the flange nut passing through the outlet groove portion slides down on the outlet groove portion with the flange surface facing downward.

In the flange-nut posture control device, in a part of the outlet groove portion, the part being connected to the second opening, the depth dimension of the V-shaped groove may be larger than a diameter of the flange portion of the flange nut. Hereby, the outlet groove portion can restrain the posture of the flange nut from being disturbed.

The flange-nut posture control device may further include a nut throwing portion opened upward and including a bottom plate portion inclined from the horizontal plane and a side plate portion provided in part of an outer edge of the bottom plate portion in a standing manner, the nut throwing portion being connected to the first opening such that the flange nut falls to the first opening from the bottom plate portion. Hereby, a user can easily throw the flange nut into the flange-nut posture control device.

In the flange-nut posture control device, the nut throwing portion may be fixed such that an inclination angle of the bottom plate portion is adjustable with a vicinity of the first opening as a fulcrum. Hereby, the flange-nut posture control device can receive a flange nut in accordance with an operation mode of the user appropriately.

In the flange-nut posture control device, the nut throwing portion may include an auxiliary plate portion provided on the bottom plate portion via a step smaller than a thickness of the flange nut such that an angle smaller than 180 degrees is formed between the auxiliary plate portion and the bottom plate portion. Hereby, the nut throwing portion can restrain the flange nut from being stuck in the first opening.

The flange-nut posture control device may further include: an outlet flat portion connected to the outlet groove portion with an inclination larger than an inclination of the outlet groove portion; and a discharge guide having an introducing shape and including a height restriction portion, the discharge guide being provided on a lower side of the inclination of the outlet flat portion such that the discharge guide is placed above the outlet flat portion. Hereby, the flange-nut posture control device can adjust the behavior of the flange nut.

With the present disclosure, it is possible to provide a flange-nut posture control device that can easily control the posture of a flange nut with a small scale.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The following describes the present disclosure based on an embodiment of the disclosure but is not intended to limit the disclosure according to Claims to the following embodiment. Further, all constituents described in the embodiment are not necessarily essential as the means for solving the problem. The following description and drawings are omitted or simplified appropriately for clarification of the description. In each of the drawings, the same element has the same reference sign, and a redundant description is omitted as needed.

Figure 1:
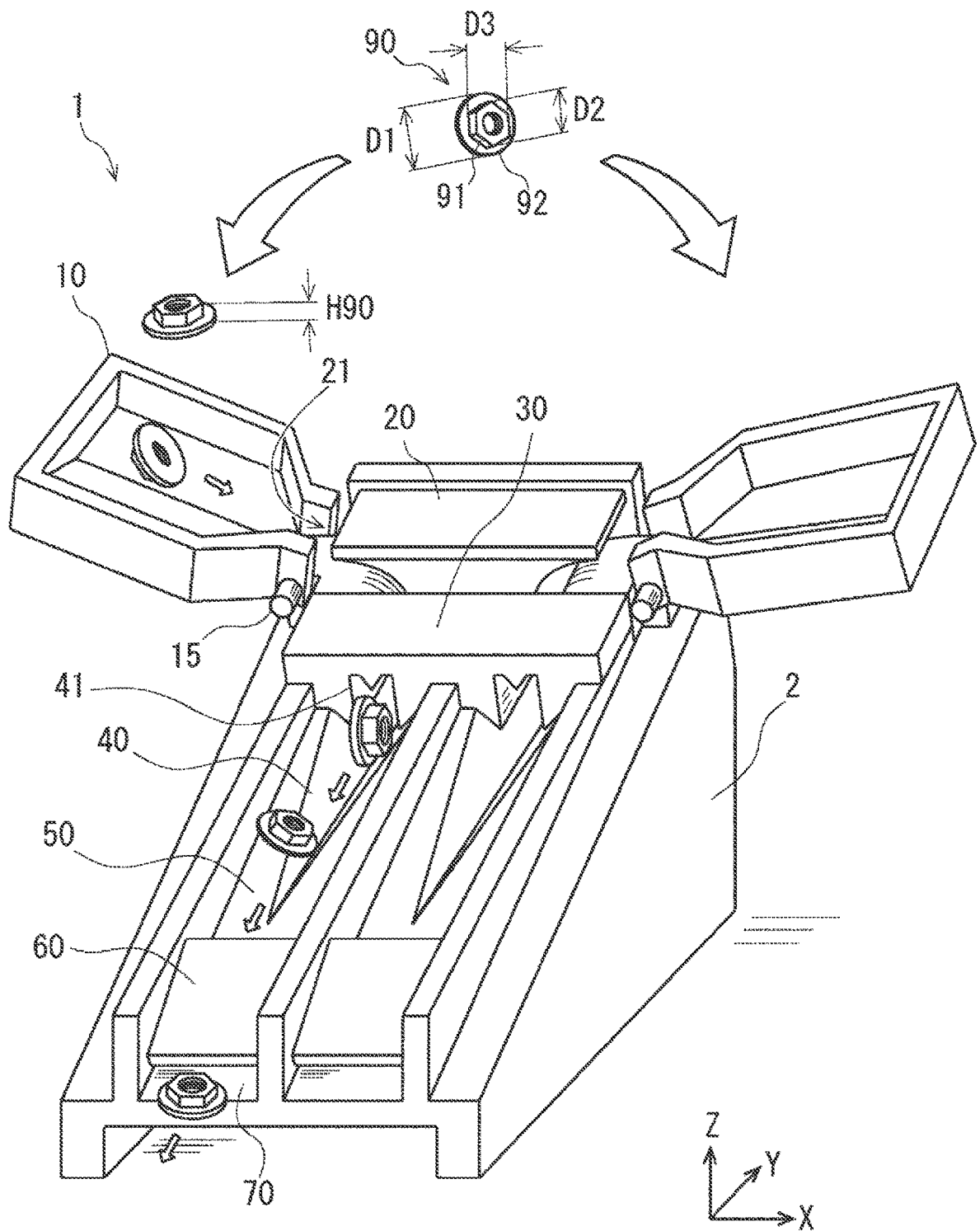
FIG. 1 is an outline drawing of a flange-nut posture control device according to an embodiment.

The following describes an outline of a flange-nut posture control device according to an embodiment of the present disclosure. FIG. 1 is an outline drawing of the flange-nut posture control device according to the embodiment. FIG. 1 illustrates a state where the flange-nut posture control device is observed from its diagonally upper side.

Note that a right-handed rectangular coordinate system is illustrated in FIG. 1 for convenience of description of a positional relationship between constituents. Further, in a case where rectangular coordinate systems are provided in FIG. 2 and its subsequent figures, an X-axis direction, a Y-axis direction, and a Z-axis direction in FIG. 1 correspond to an X-axis direction, a Y-axis direction, and a Z-axis direction in each of the rectangular coordinate systems, respectively. Further, in the description of the present embodiment, a "right-left direction" indicates the X-axis direction, a "front-rear direction" indicates the Y-axis direction, and a "height direction" indicates the Z-axis direction.

When a nut with a flange (a flange nut) is thrown in a flange-nut posture control device 1 illustrated in FIG. 1 in a given posture, the flange-nut posture control device 1 discharges the flange nut thus thrown therein in a posture in which a flange surface of the flange nut faces downward. A flange nut 90 to be received by the flange-nut posture control device 1 includes a nut portion 91 and a flange portion 92. As the dimension of the flange nut 90, the diameter of the flange portion 92 is a diameter D1. The nut portion 91 is configured such that a diagonal-line part between opposite angles has a length D2, and an opposite-side part between opposite sides has a length D3. Further, the thickness of the flange nut 90 is a thickness H90. Note that, in the following description, that "the flange nut 90 has a vertical orientation" indicates that the axis of a threaded part of the flange nut 90 is along the up-down direction. Further, that "the flange nut 90 has a lateral orientation" indicates that the axis of the threaded part of the flange nut 90 is along a lateral direction (a direction perpendicular to the Z-axis).

Note that the flange-nut posture control device 1 illustrated in FIG. 1 includes two structures having the same configuration and provided in a symmetric manner in the right-left direction. That is, the flange-nut posture control device 1 receives two flange nuts 90 at the same time and discharges the two flange nuts 90 thus received by adjusting the postures of the two flange nuts 90. The following description deals with one of the two structures as a typical example, and the other one of the two structures is not described herein. However, the other one of the two structures has the same configuration and function as those of the one of the two structures.

The flange-nut posture control device 1 is provided with various constituents on a base portion 2 grounded to a floor face. The base portion 2 is formed such that its height decreases from a Y-axis positive side to a Y-axis negative side in a front-rear direction, that is, the Y-axis direction. The flange-nut posture control device 1 includes, as main constituents, a nut throwing portion 10, a direction control block 20, an inclination control block 30, an outlet groove portion 40, an outlet flat portion 50, a discharge guide 60, and a discharge portion 70. The following describes outlines of those constituents along the order of movement of the flange nut 90.

Right and left end parts of an upper part of the Y-axis positive side of the base portion 2 include respective nut throwing portions 10. The nut throwing portion 10 is an input port opened upward and receives the flange nut 90 thrown by a user. The nut throwing portion 10 is connected to a first opening 21, so that the flange nut 90 thus received falls to the first opening 21. The nut throwing portion 10 is fixed to a vicinity of the first opening 21 by a locking screw 15.

The first opening 21 receives the flange nut 90 falling from the nut throwing portion 10 and puts the flange nut 90 into the direction control block 20. The direction control block 20 is provided on the Y-axis positive side of the base portion 2. The direction control block 20 controls the flange nut 90 thus falling from the first opening 21 along an inclined surface of the direction control block 20 such that a flange surface of the flange nut 90 becomes generally parallel to a YZ-plane. The direction control block 20 guides the flange nut 90 to the inclination control block 30 by controlling the posture of the flange nut 90 as described above.

The inclination control block 30 is adjacent to the Y-axis negative side of the direction control block 20. The inclination control block 30 restrains the behavior of the flange nut 90 thus falling from the direction control block 20 and further controls the inclination of the flange portion 92 so that the flange nut 90 easily falls with the flange surface facing downward. The inclination control block 30 discharges the flange nut 90 from a second opening 41 and guides the flange nut 90 to the outlet groove portion 40 along an inclined surface of the inclination control block 30.

The outlet groove portion 40 is a V-shaped groove extending along the Y-axis direction such that its height decreases from the Y-axis positive side to the Y-axis negative side. The outlet groove portion 40 changes the posture of the flange nut 90 received via the second opening 41 such that the flange surface faces downward from a state where the flange surface faces a lateral side. The outlet groove portion 40 further guides the flange nut 90 in the posture thus changed to slide down to the outlet flat portion 50.

The outlet flat portion 50 is a flat surface extending along the Y-axis direction such that its height decreases from the Y-axis positive side to the Y-axis negative side. The outlet flat portion 50 receives the flange nut 90 the flange surface of which faces downward and causes the flange nut 90 thus received to fall to the discharge guide 60 along an inclined surface of the outlet flat portion 50. The discharge guide 60 restrains the behavior of the flange nut 90 sliding down on the outlet flat portion 50 and guides the flange nut 90 to the discharge portion 70. The discharge portion 70 causes the flange nut 90 the posture of which is controlled to fall to the Y-axis negative side.

The main constituents of the flange-nut posture control device 1 have been described above with reference to FIG. 1. Note that the flange nut 90 discharged from the discharge portion 70 is aligned by a jig or the like configured to align the flange nut 90. Thus, the flange-nut posture control device 1 discharges the flange nut 90 thrown therein in a given posture by adjusting the posture of the flange nut 90 such that the flange surface faces downward.

Figure 2:
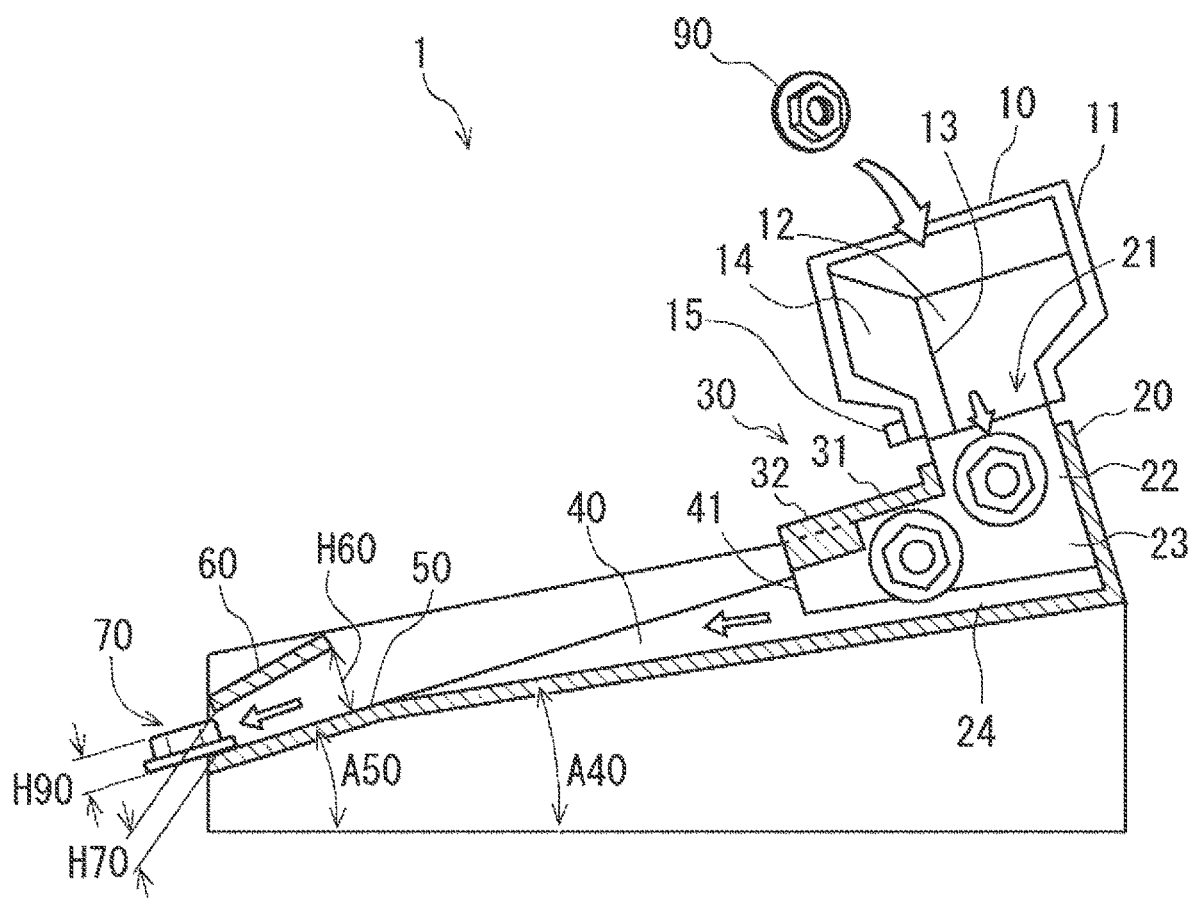
FIG. 2 is a sectional view of the flange-nut posture control device.
Figure 2:
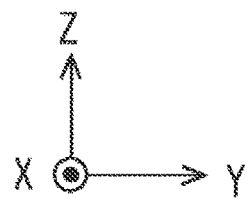

With reference to FIG. 2, the following further describes the constituents. FIG. 2 is a sectional view of the flange-nut posture control device. A section of the flange-nut posture control device 1 that is cut in parallel to the YZ-plane along the bottom of the V-shaped groove formed in the outlet groove portion 40 is illustrated in FIG. 2.

Figure 3:
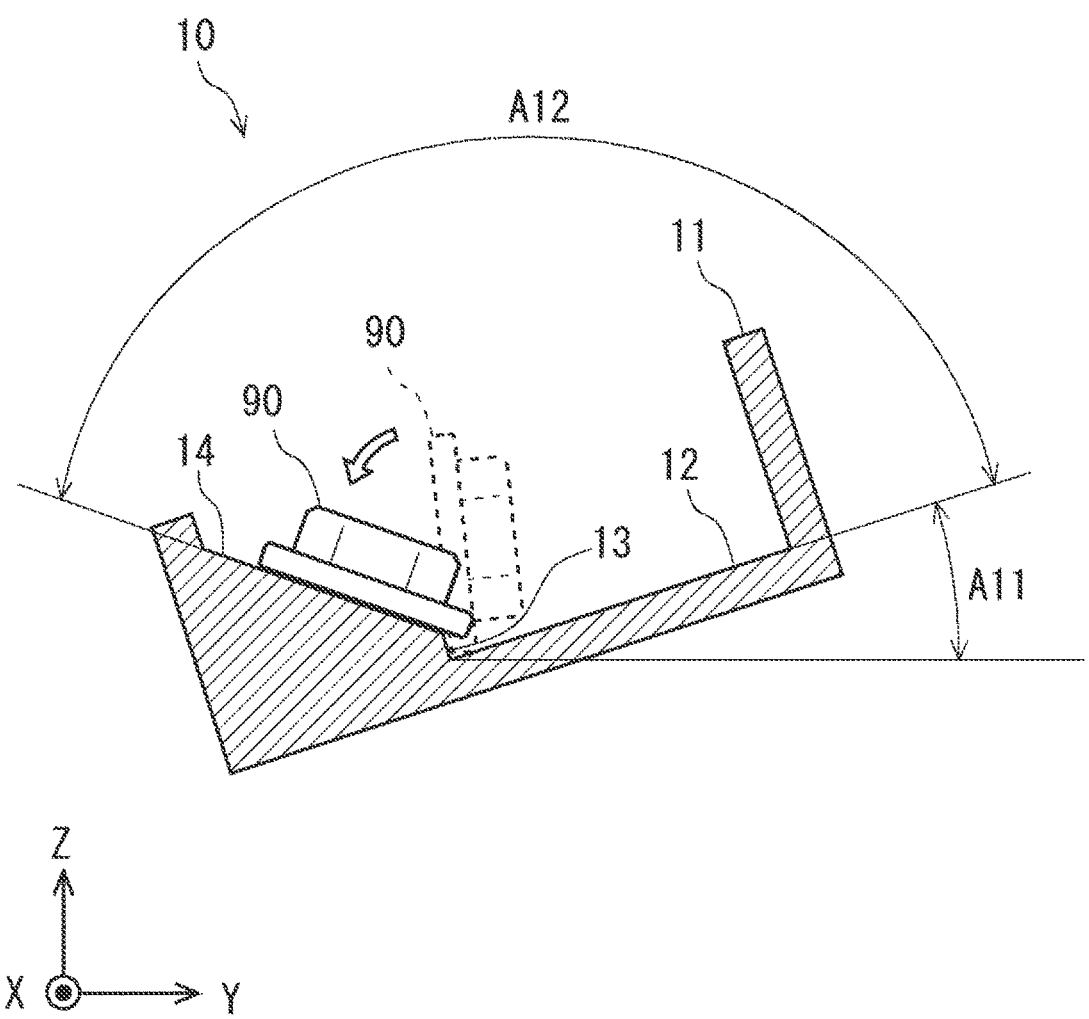
FIG. 3 is a sectional view illustrating a nut throwing portion.
Figure 4:
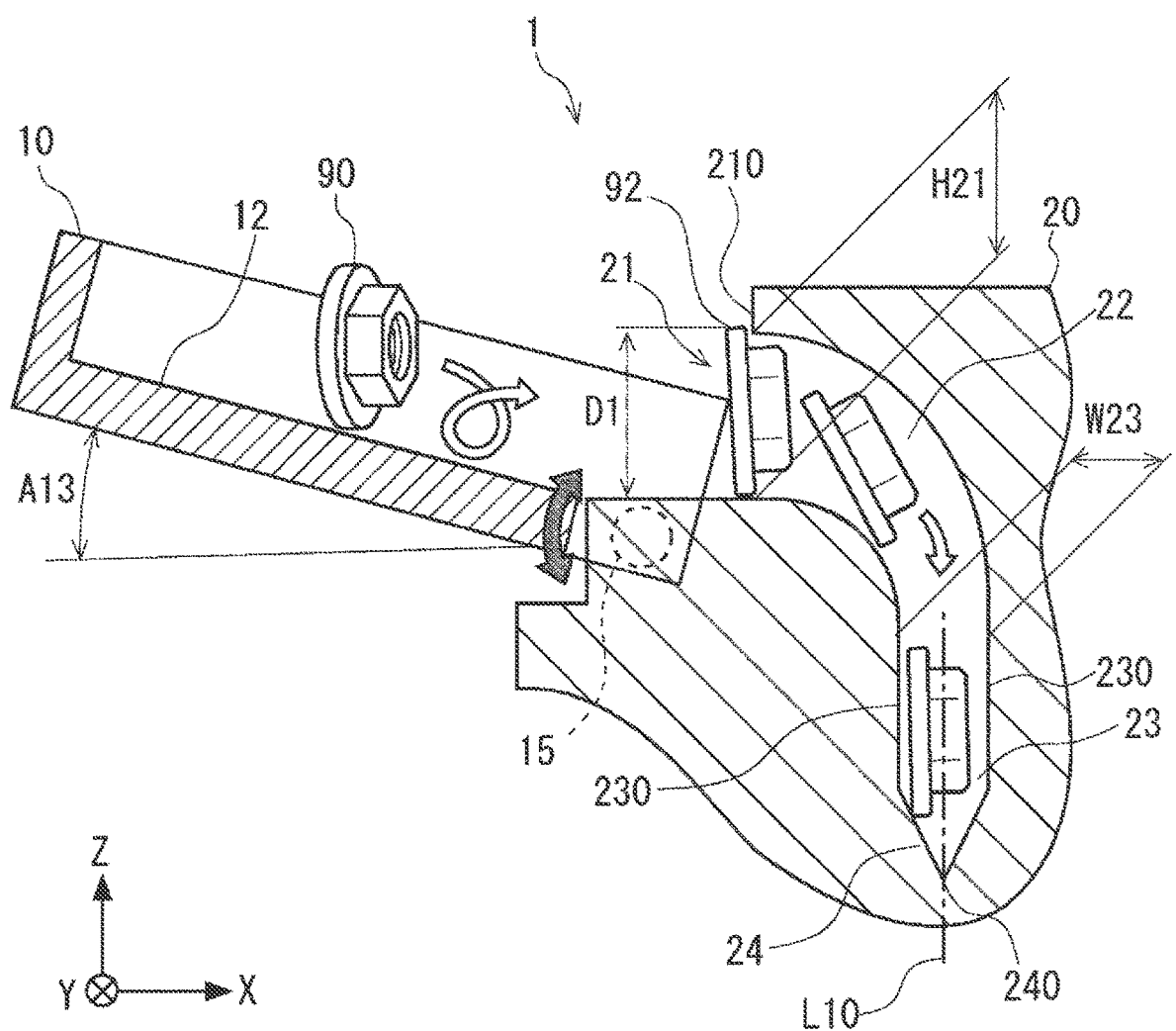
FIG. 4 is a sectional view illustrating the nut throwing portion and a direction control block.

The following describes details of the nut throwing portion 10 with reference to FIGS. 2, 3, 4. FIG. 3 is a sectional view illustrating the nut throwing portion. A section of the nut throwing portion 10 that is cut in parallel to the YZ-plane at an intermediate part of the nut throwing portion 10 in the right-left direction is illustrated in FIG. 3. FIG. 4 is a sectional view illustrating the nut throwing portion and the direction control block. A section of the flange-nut posture control device 1 that is cut in parallel to an XZ-plane at an intermediate part of the nut throwing portion 10 in the front-rear direction is illustrated in FIG. 4.

The nut throwing portion 10 is opened upward and includes a bottom plate portion 12 inclined from a horizontal plane and a side plate portion 11 provided in part of an outer edge of the bottom plate portion 12 in a standing manner. Further, the nut throwing portion 10 is connected to the first opening 21 such that the flange nut 90 can fall to the first opening 21 from the bottom plate portion 12. As illustrated in FIG. 3, the bottom plate portion 12 has an angle A11 from the horizontal plane in the front-rear direction so that the Y-axis negative side of the bottom plate portion 12 is lower than the Y-axis positive side thereof. Further, as illustrated in FIG. 4, the bottom plate portion 12 has an angle A13 so that the flange nut 90 rolls down to the first opening 21 in the right-left direction. Hereby, the user can easily throw the flange nut 90 by dropping the flange nut 90 to the nut throwing portion 10.

Further, the nut throwing portion 10 further includes a stepped portion 13 and an auxiliary plate portion 14 on the bottom plate portion 12. The stepped portion 13 is provided between the bottom plate portion 12 and the auxiliary plate portion 14. The stepped portion 13 has a dimension smaller than the thickness of the flange nut 90. The stepped portion 13 is set such that, in a case where the flange nut 90 rolls with the flange surface facing the lateral side like the flange nut 90 indicated by a dotted line in FIG. 3, the flange nut 90 falls down by being caught in the stepped portion 13 like the flange nut 90 indicated by a continuous line. Hereby, the nut throwing portion 10 can restrain the flange nut 90 from being stuck in the first opening 21.

The auxiliary plate portion 14 is an inclined surface provided on the bottom plate portion 12 via the stepped portion 13 and has an angle A12 from the bottom plate portion, the angle A12 being smaller than 180 degrees. Further, the auxiliary plate portion 14 extends in the right-left direction. On that account, the flange nut 90 present on the auxiliary plate portion 14 falls to the first opening 21.

The nut throwing portion 10 is fixed by the locking screw 15 in a lower part of the vicinity of the first opening 21. The nut throwing portion 10 is fixed by the locking screw 15 such that the inclination angle of the bottom plate portion 12 is adjustable with the vicinity of the first opening 21 as a fulcrum. On this account, the nut throwing portion 10 can change the angle A13 such that the locking screw 15 is released once, the nut throwing portion 10 is rotated around a fastening portion of the locking screw 15, and the locking screw 15 is tightened again. The user who uses the flange-nut posture control device 1 can set the angle of the nut throwing portion 10 in consideration of easy operation. Hereby, the flange-nut posture control device 1 can receive the flange nut in accordance with an operation mode of the user appropriately.

Note that, in order to cause the flange nut 90 to fall, it is preferable that the bottom plate portion 12 be made of a material having high abrasiveness. Further, it is preferable that the bottom plate portion 12 be slippery, so that it is preferable that the bottom plate portion 12 be made of a material having a low friction coefficient with the flange nut 90. A member having these properties is, for example, an embossed metal plate, glass, fluororesin, or the like.

Next will be described the direction control block 20. As illustrated in FIG. 4, the direction control block 20 includes the first opening 21, an introduction portion 22, a direction controlling portion 23, and a lower guide portion 24 as main constituents.

The first opening 21 receives the flange nut 90 falling from the nut throwing portion 10 along an inclined surface of the nut throwing portion 10. A lower part of the first opening 21 is smoothly connected to the bottom plate portion 12 of the nut throwing portion 10 so that the flange nut 90 falls smoothly. Further, the first opening 21 guides the flange nut 90 falling from the left side in FIG. 4 to the introduction portion 22 on the right side. In a case where the flange nut 90 falls to the first opening 21 with a vertical orientation or in a posture near the vertical orientation, the first opening 21 just receives the flange nut 90 and guides it to the introduction portion 22.

Further, the first opening 21 includes a nut laying-down guide 210 in an upper part of the first opening 21. The dimension of the first opening 21 in the up-down direction from a surface on which the flange nut 90 rolls down to the nut laying-down guide 210 is a height H21. The height H21 is set to be slightly smaller than the diameter D1 of the flange portion 92. On this account, as illustrated in FIG. 4, when the flange nut 90 falls to the first opening 21 in a posture where the flange nut 90 has a lateral orientation, an upper end of the flange portion 92 of the flange nut 90 hits the nut laying-down guide 210. Hereby, the flange nut 90 receives a rotational moment around the Y-axis, so that the flange nut 90 falls to the introduction portion 22 while the flange nut 90 changes its posture to the vertical orientation.

The introduction portion 22 guides the flange nut 90 falling from the first opening 21 to the direction controlling portion 23. The introduction portion 22 has a space having the height H21 in the first opening 21 and extends to the lower right side while the height is reduced. The introduction portion 22 then gradually bends downward and is connected to the direction controlling portion 23.

The direction controlling portion 23 receives the flange nut 90 via the introduction portion 22 below the first opening. The direction controlling portion 23 is constituted by two vertical wall portions 230 extending in the vertical direction and facing each other. A width W23 of the direction controlling portion 23 between the vertical wall portions 230 distanced from each other is larger than the thickness H90 of the flange nut 90 but smaller than the diameter D1 of the flange nut. In other words, the vertical wall portions 230 distanced from each other face each other via a space with a distance larger than the thickness H90 of the flange nut 90 but smaller than the diameter D1 of the flange portion of the flange nut. Accordingly, the direction controlling portion 23 controls the flange nut 90 such that the flange nut 90 has a posture in the lateral orientation.

The lower guide portion 24 is a V-shaped groove provided below the vertical wall portions 230, and the lower guide portion 24 receives a bottom end of the flange nut 90 thus falling. The lower guide portion 24 is formed such that the V-shaped groove having a bottom portion 240 on a neutral plane L10 between the two vertical wall portions 230 extends along the vertical wall portions 230, and the V-shaped groove is inclined from the horizontal plane (the XY-plane) such that the position of a second end side (the Y-axis negative side) of the V-shaped groove is lower than the position of a first end side (the Y-axis positive side) of the V-shaped groove. At this time, the inclination angle of the lower guide portion 24 is an angle A40 illustrated in FIG. 2.

The direction control block has been described above. With the configuration described above, the direction control block 20 receives the flange nut 90 in a given posture and controls the posture of the flange nut 90 such that the flange nut 90 has a lateral orientation.

Figure 5:
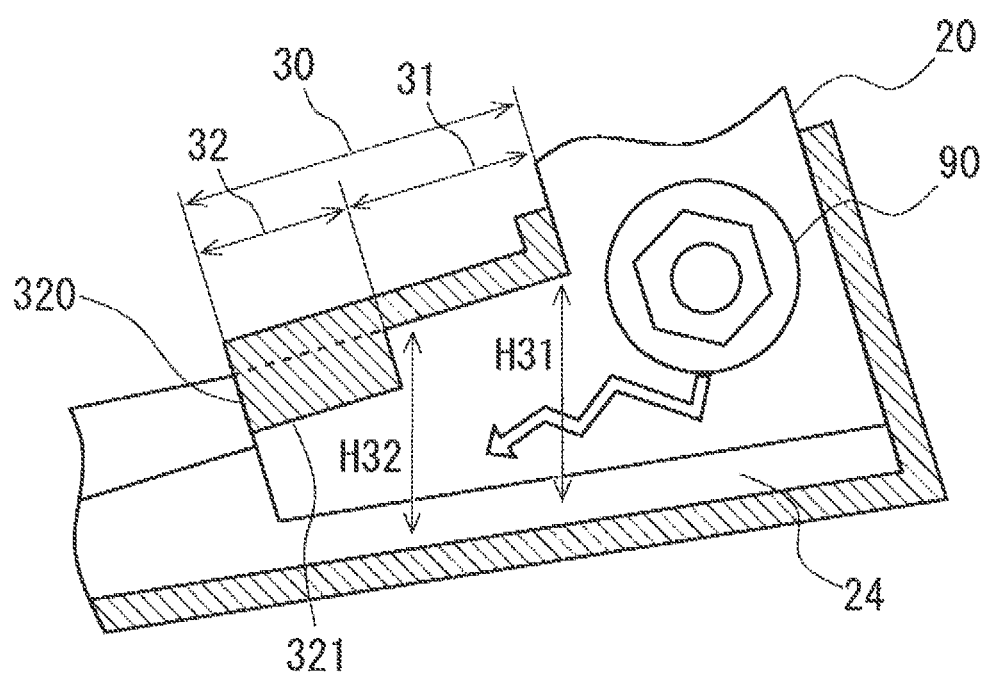
FIG. 5 is a first sectional view illustrating an inclination control block.

Next will be described the inclination control block 30. FIG. 5 is a first sectional view illustrating the inclination control block. The flange nut 90 falling on the direction control block 20 then falls to the inclination control block 30 due to gravity. At this time, the flange nut 90 falls to the Y-axis negative side while the flange nut 90 bounces up by hitting the lower guide portion 24. The inclination control block 30 restrains such a behavior of the flange nut 90 and further controls the inclination of the flange nut 90. The inclination control block 30 includes a bouncing prevention guide 31 and an upper guide portion 32 above the Y-axis negative side of the lower guide portion 24.

The bouncing prevention guide 31 is adjacent to a first end side (the Y-axis positive side) of the upper guide portion 32 and restricts the movement of the upper end of the flange nut 90. The bouncing prevention guide 31 is provided over the two vertical wall portions 230 with an inclination larger than that of the lower guide portion such that the dimension, in the up-down direction, of the Y-axis positive side of the bouncing prevention guide 31 is larger than the dimension, in the up-down direction, of the Y-axis negative side of the bouncing prevention guide 31. More specifically, as illustrated in FIG. 5, a part between the Y-axis positive side of the bouncing prevention guide 31 and the lower guide portion 24 has a height H31. Further, a part between the Y-axis negative side of the bouncing prevention guide 31 and the lower guide portion 24 has a height H32 smaller than the height H31.

Figure 6:
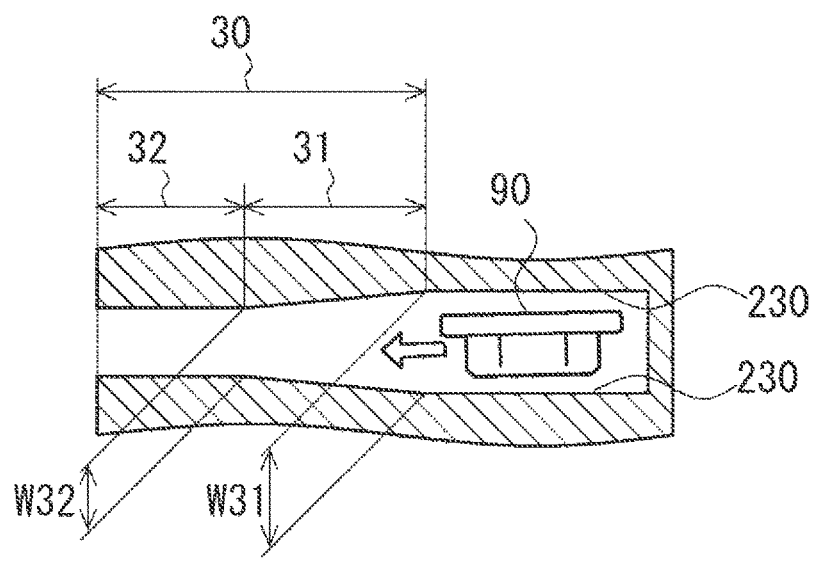
FIG. 6 is a second sectional view illustrating the inclination control block.
Figure 6:
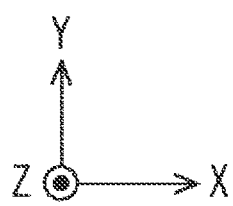

FIG. 6 is a second sectional view illustrating the inclination control block 30. FIG. 6 illustrates a section of the inclination control block 30 that is cut in parallel to the XY plane at a given position in the height direction. The inclination control block 30 illustrated in FIG. 6 is configured such that the width, in the right-left direction, of the bouncing prevention guide 31 changes. More specifically, the width, in the right-left direction, of the Y-axis positive side of the bouncing prevention guide 31 is a width W31. Further, the width, in the right-left direction, of the Y-axis negative side of the bouncing prevention guide 31 is a width W32 smaller than the width W31. Thus, the Y-axis negative side of the bouncing prevention guide 31 is narrowed in width in the right-left direction in addition to the up-down direction, so that the movement of the flange nut 90 thus falling is restricted. With the above configuration, the bouncing prevention guide 31 can guide the flange nut 90 to the upper guide portion 32 by restraining an unstable behavior of the flange nut 90.

Next will be described the upper guide portion 32. The upper guide portion 32 includes a guide rib 320 above a second end side (the Y-axis negative side) of the lower guide portion 24. The guide rib 320 projects downward with a top part 321 being disposed on the neutral plane between the two vertical wall portions 230 and extends along the vertical wall portions and in parallel to the lower guide portion 24 that is the V-shaped groove.

Figure 7:
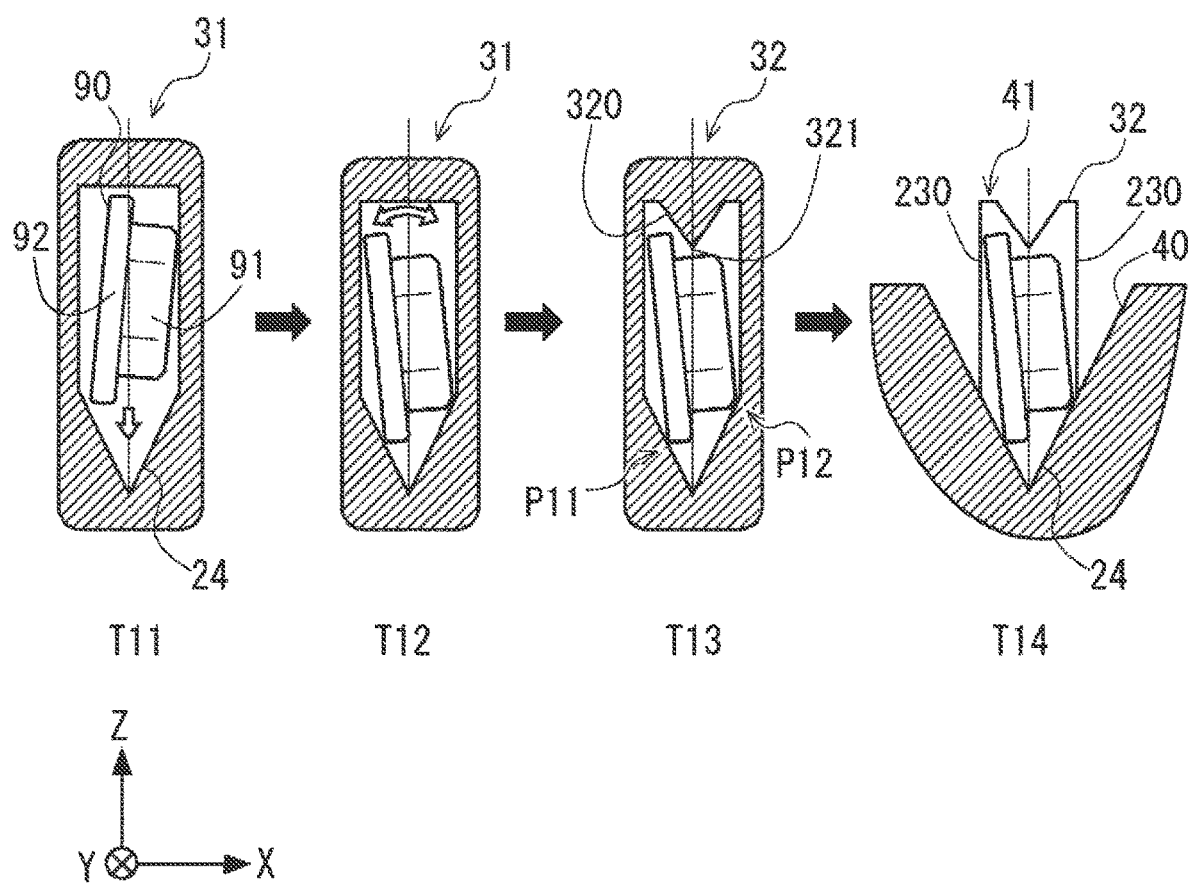
FIG. 7 is a view illustrating an example of the behavior of a flange nut in the inclination control block.

With reference to FIG. 7, the following describes the behavior of the flange nut 90 in the inclination control block 30. FIG. 7 is a view illustrating an example of the behavior of the flange nut in the inclination control block. FIG. 7 illustrates a state of the flange nut 90 along the flow of time when the flange nut 90 passes through the inclination control block 30. FIG. 7 illustrates the flange nut 90 changing with the passage of time sequentially from time T11 illustrated on the left side toward the right side.

First, in time T11, the flange nut 90 is in a state where the flange nut 90 falls on the bouncing prevention guide 31 while the flange nut 90 bounces up. The behavior of the flange nut 90 is unstable, and the flange nut 90 is up in the air. The height of the bouncing prevention guide 31 generally decreases, and the width of the bouncing prevention guide 31 also decreases. Along with this, the movement of the flange nut 90 in the up-down direction is gradually restricted by the bouncing prevention guide 31.

Subsequently, in time T12 after time T11, the flange nut 90 is in a state where the flange nut 90 lands on the lower guide portion 24. In this state, the bouncing of the flange nut 90 is restrained. However, the inclination of the flange nut 90 in the right-left direction is not uniform and can change.

Subsequently, in time T13 after time T12, the flange nut 90 moves to the upper guide portion 32. As illustrated herein, the upper guide portion 32 includes the guide rib 320. The guide rib 320 is set such that the top part 321 is lower than the upper end of the flange portion 92 in the flange nut 90. Hereby, the upper guide portion 32 controls the inclination of the flange portion 92 in the right-left direction. Thus, the upper guide portion 32 controls the posture of the flange nut in a direction where the flange nut 90 falls down with the flange surface facing downward. Note that, in this state, a contact portion P11 and a contact portion P12 of the flange nut 90 make contact with inclined surfaces of the lower guide portion 24. The contact portion P11 is a lower corner of the flange portion 92. The contact portion P12 is a lower corner of the nut portion 91.

Subsequently, in time T14 after time T13, the flange nut 90 leaves the upper guide portion 32 via the second opening 41 and moves to the outlet groove portion 40. The second opening 41 is an opening surrounded by the vertical wall portions 230, the lower guide portion 24, and the upper guide portion 32. The second opening 41 causes the flange nut 90 to pass therethrough in a predetermined posture. The predetermined posture indicates a posture in a direction where the flange nut 90 falls down with the flange surface facing downward. That is, the flange nut 90 that has passed through the second opening 41 then changes its posture into the direction where the flange surface faces downward.

The inclination control block 30 has been described above. As described above, in the inclination control block 30, the bouncing prevention guide 31 and the upper guide portion 32 restrain an unstable behavior of the flange nut 90 and control the flange nut 90 to the direction where the flange nut 90 falls down with the flange surface facing downward.

Now referring back to FIG. 2, the following describes the outlet groove portion 40 and the outlet flat portion 50. As illustrated in FIG. 2, the outlet groove portion 40 has a V-shaped groove connected to the lower guide portion 24 at an end surface of the second opening 41 and extending in a direction distanced from the end surface of the second opening 41 with the same inclination as the lower guide portion 24. That is, the inclination of the outlet groove portion 40 is the angle A40 such that the outlet groove portion 40 is low on the Y-axis negative side and high on the Y-axis positive side. Further, the outlet groove portion 40 is configured such that the depth dimension of the V-shaped groove becomes shallower as the V-shape groove is distanced from the second opening 41.

The outlet flat portion 50 is connected to the outlet groove portion 40 with an inclination larger than that of the outlet groove portion 40. As illustrated in FIG. 2, the outlet flat portion 50 is inclined at an angle A50 larger than the inclination of the outlet groove portion 40. With such a configuration, the outlet groove portion 40 and the outlet flat portion 50 can smoothly control the change in the posture of the flange nut.

Figure 8:
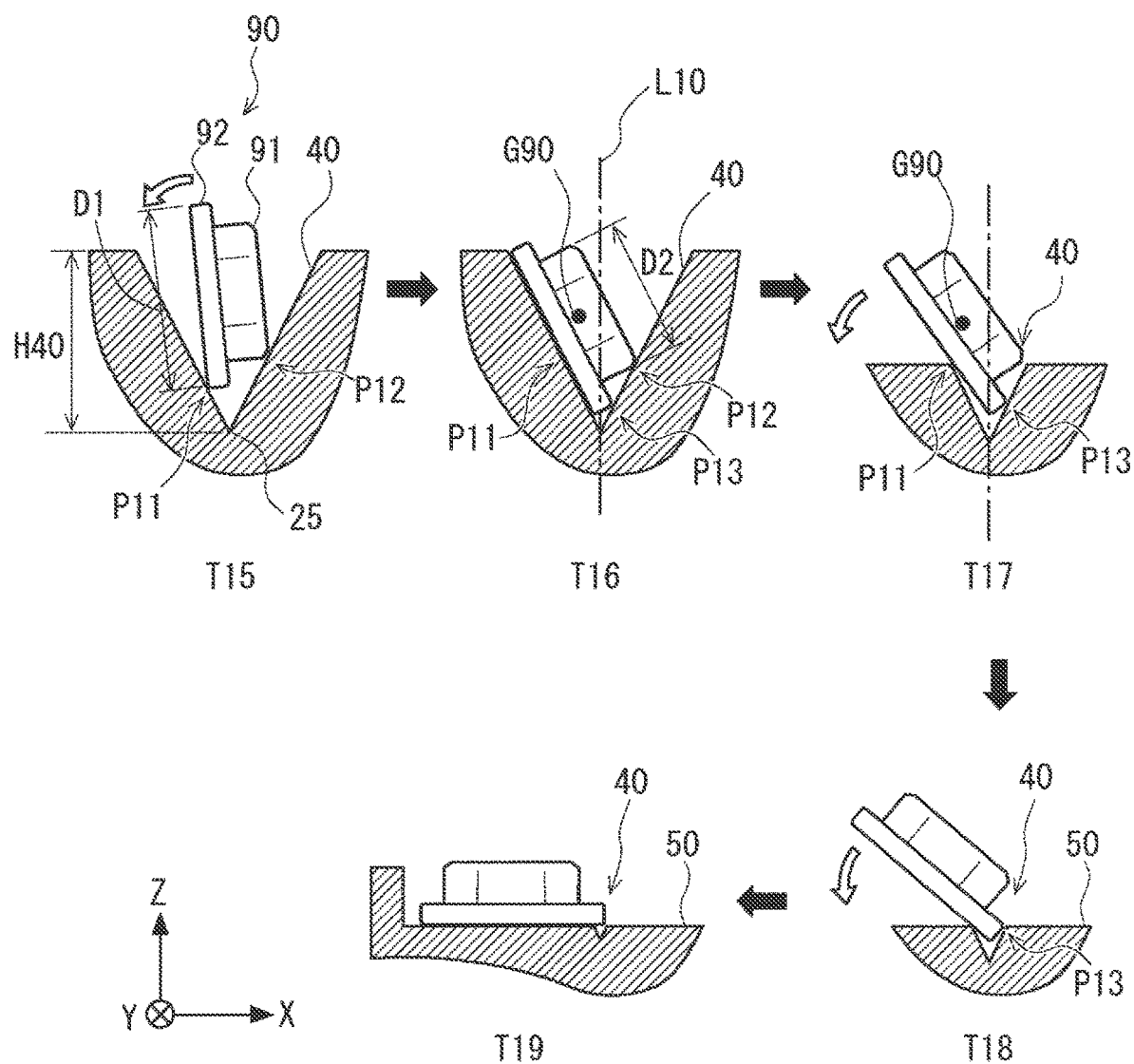
FIG. 8 is a view illustrating an example of the behavior of the flange nut in an outlet groove portion and an outlet flat portion.

With reference to FIG. 8, the following describes a state of the flange nut 90 in the outlet groove portion 40 after time T14 illustrated in FIG. 7. FIG. 8 is a view illustrating an example of the behavior of the flange nut in the outlet groove portion and the outlet flat portion. Similarly to FIG. 7, FIG. 8 illustrates the behavior of the flange nut 90 along the passage of time.

In time T15 after time T14, the flange nut 90 that has moved to the outlet groove portion 40 rotates counterclockwise as indicated by an arrow from the state where the contact portions P11 and P12 make contact with the inclined surfaces of the lower guide portion 24. Note that a depth H40 of the outlet groove portion 40 connected to the second opening 41 is set to be larger than the diameter D1 of the flange portion 92 in the flange nut 90. Hereby, the outlet groove portion 40 can restrain the posture of the flange nut 90 from being disturbed.

Subsequently, in time T16 after time T15, the flange nut 90 is in a state where the contact portion P11, the contact portion P12, and a contact portion P13 of the flange nut 90 make contact with inclined surfaces of the outlet groove portion 40. Here, the contact portion P11 is the flange surface. Further, the contact portion P12 is a lower corner of the diagonal-line part (the part having the length D2 illustrated in FIG. 1) of the nut portion 91. Further, the contact portion P13 is a lower side part of the flange portion 92. In the flange-nut posture control device 1, the outlet groove portion 40 supports the flange nut in a state where the flange surface of the flange nut 90 makes contact with a first inclined surface of the V-shaped groove, and the corner of the diagonal-line part on the nut surface of the flange nut 90 and the side part of the flange portion make contact with a second inclined surface of the V-shaped groove.

Further, in the state illustrated in time T16, a gravitational center G90 of the flange nut 90 is inclined toward the flange portion 92 side relative to a center line L10 of the outlet groove portion 40. That is, the outlet groove portion 40 is set such that the gravitational center G90 of the flange nut comes closer to the inclined surface making contact with the flange surface than to the inclined surface with which the corner of the diagonal-line part makes contact. Hereby, the flange nut 90 passing through the outlet groove portion 40 slides down on the outlet groove portion 40 with the flange surface facing downward.

Subsequently, in time T17 after time T16, the outlet groove portion 40 is shallow because the flange nut 90 slides downward along the inclined surfaces. The flange nut 90 in time T17 makes contact with the outlet groove portion 40 at the contact portion P11 and the contact portion P13. Here, the contact portion P11 in T17 is placed below the gravitational center G90. Accordingly, the flange nut 90 rotates counterclockwise.

Subsequently, in time T18 after time T17, the outlet groove portion 40 is further shallow because the flange nut 90 slides further downward. Accordingly, the outlet groove portion 40 cannot support the flange nut 90, so that the flange nut 90 further rotates counterclockwise.

Subsequently, in time T19 after time T18, the flange nut 90 leaves the outlet groove portion 40, so that the flange surface makes contact with the outlet flat portion 50. Thus, the flange nut 90 falling on the outlet groove portion 40 and the outlet flat portion 50 takes a posture with the flange surface facing downward such that the flange surface makes contact with the outlet flat portion 50.

Referring back to FIG. 2, the following describes the discharge guide 60. The flange nut 90 sliding down on the outlet flat portion 50 passes under the discharge guide 60, on the lower side of the outlet flat portion 50. The Y-axis positive side of the discharge guide 60 has an introducing shape. The introducing shape has a height H60 from the outlet flat portion 50. Further, the Y-axis negative side of the discharge guide 60 serves as a height restriction portion. The height of the height restriction portion from the outlet flat portion 50 is a height H70 lower than the height H60. Here, the height H70 is slightly larger than the thickness H90 of the flange nut 90. Accordingly, the discharge guide 60 does not disturb the movement of the flange nut 90 sliding down on the outlet flat portion 50. In the meantime, when the flange nut 90 exhibits an unstable behavior such as bouncing, the discharge guide 60 restricts the movement of the flange nut 90 thus bouncing and restrains the unstable behavior. Hereby, the flange-nut posture control device 1 can discharge, from the discharge portion 70, the flange nut 90 in a stable posture.

The embodiment has been described above, but the configuration of the flange-nut posture control device 1 according to the embodiment is not limited to the above description. The flange-nut posture control device 1 according to the embodiment may not be formed in a symmetric shape in the right-left direction as illustrated in FIG. 1. Further, the flange-nut posture control device 1 may be configured such that three or more posture control devices are connected to each other.

With the present embodiment, it is possible to provide a flange-nut posture control device that can easily perform a bolt supply operation with a small scale. Note that the present disclosure is not limited to the above embodiment, and various modifications can be made within a range that does not deviate from the gist of the present disclosure.

What is claimed is:

1. A flange-nut posture control device for discharging a flange nut by controlling a posture of the flange nut, the flange-nut posture control device comprising:
   a first opening configured to receive the flange nut;
   a direction controlling portion provided below the first opening, the direction controlling portion being constituted by vertical wall portions extending in a vertical direction such that the vertical wall portions are distanced from each other to face each other via a space with a distance larger than a thickness of the flange nut but smaller than a diameter of a flange portion of the flange nut;
   a lower guide portion provided below the direction controlling portion such that a V-shaped groove having a bottom portion between the vertical wall portions extends along the vertical wall portions, the V-shaped groove being inclined from a horizontal plane such that a position of a second end side of the V-shaped groove is lower than a position of a first end side of the V-shaped groove;
   a second opening surrounded by at least the vertical wall portions and the lower guide portion and formed such that the flange nut is passed through the second opening; and
   an outlet groove portion connected to the lower guide portion at an end surface of the second opening, the outlet groove portion having a V-shaped groove extending to be inclined such that the V-shaped groove is lowered toward a direction distanced from the end surface, the V-shaped groove having a depth dimension that becomes shallower as the V-shaped groove is distanced from the end surface.

2. The flange-nut posture control device according to claim 1, further comprising an upper guide portion provided above the second end side of the lower guide portion and including a guide rib projecting downward with a top part being disposed between the vertical wall portions, the guide rib extending along the vertical wall portions and in parallel to the V-shaped groove of the lower guide portion.

3. The flange-nut posture control device according to claim 2, wherein the upper guide portion is set such that the top part of the guide rib is lower than an upper end of the flange portion of the flange nut passing through the upper guide portion.

4. The flange-nut posture control device according to claim 2, further comprising a bouncing prevention guide provided adjacent to the first end side of the upper guide portion, the bouncing prevention guide being provided over the two vertical wall portions with an inclination larger than an inclination of the lower guide portion such that a dimension on the second end side between the bouncing prevention guide and the lower guide portion is smaller than a dimension on the first end side between the bouncing prevention guide and the lower guide portion.

5. The flange-nut posture control device according to claim 1, wherein the outlet groove portion is set such that, in a state where a flange surface of the flange nut makes contact with a first inclined surface of the V-shaped groove, and a corner of a diagonal-line part on a nut surface of the flange nut and a side part of the flange portion of the flange nut make contact with a second inclined surface of the V-shaped groove, a gravitational center of the flange nut comes closer to the first inclined surface making contact with the flange surface than to the second inclined surface with which the corner of the diagonal-line part makes contact.

6. The flange-nut posture control device according to claim 1, wherein, in a part of the outlet groove portion, the part being connected to the second opening, the depth dimension of the V-shaped groove is larger than a diameter of the flange portion of the flange nut.

7. The flange-nut posture control device according to claim 1, further comprising a nut throwing portion opened upward and including a bottom plate portion inclined from the horizontal plane and a side plate portion provided in part of an outer edge of the bottom plate portion in a standing manner, the nut throwing portion being connected to the first opening such that the flange nut falls to the first opening from the bottom plate portion.

8. The flange-nut posture control device according to claim 7, wherein the nut throwing portion is fixed such that an inclination angle of the bottom plate portion is adjustable with a vicinity of the first opening as a fulcrum.

9. The flange-nut posture control device according to claim 7, wherein the nut throwing portion includes an auxiliary plate portion provided on the bottom plate portion via a step smaller than a thickness of the flange nut such that an angle smaller than 180 degrees is formed between the auxiliary plate portion and the bottom plate portion.

10. The flange-nut posture control device according to claim 1, further comprising:
   an outlet flat portion connected to the outlet groove portion with an inclination larger than an inclination of the outlet groove portion; and
   a discharge guide having an introducing shape and including a height restriction portion, the discharge guide being provided on a lower side of the inclination of the outlet flat portion such that the discharge guide is placed above the outlet flat portion.

* * * * *